(12) United States Patent
Schuler et al.

(10) Patent No.: US 9,360,111 B2
(45) Date of Patent: Jun. 7, 2016

(54) PISTON-CYLINDER UNIT

(71) Applicants: Manfred Schuler, Dittelbrunn (DE); Günther Handke, Euerbach (DE); Bernd Zeissner, Volkach (DE); Bernhard Weingärtner, Knetzgau (DE)

(72) Inventors: Manfred Schuler, Dittelbrunn (DE); Günther Handke, Euerbach (DE); Bernd Zeissner, Volkach (DE); Bernhard Weingärtner, Knetzgau (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 374 days.

(21) Appl. No.: 13/865,544

(22) Filed: Apr. 18, 2013

(65) Prior Publication Data

US 2013/0276625 A1   Oct. 24, 2013

(30) Foreign Application Priority Data

Apr. 19, 2012   (DE) .................. 10 2012 206 458

(51) Int. Cl.
*F16J 10/00*   (2006.01)
*F16J 1/00*   (2006.01)
*F16F 9/32*   (2006.01)

(52) U.S. Cl.
CPC . *F16J 1/00* (2013.01); *F16F 9/3242* (2013.01)

(58) Field of Classification Search
CPC ........... F16F 9/3242; F16F 9/369; F16F 9/54; F16F 9/00; F16F 9/362
See application file for complete search history.

(56) References Cited

U.S. PATENT DOCUMENTS

| | | | | |
|---|---|---|---|---|
| 5,441,132 A * | 8/1995 | Pradel | .................. | F16F 9/3242 188/276 |
| 5,651,303 A * | 7/1997 | Fish | ................................ | 92/128 |
| 5,685,400 A * | 11/1997 | Handke | .................. | F16F 9/325 188/266.6 |
| 5,743,889 A * | 4/1998 | Sams | ............................ | 604/211 |
| 5,794,742 A * | 8/1998 | Lack et al. | .............. | 188/321.11 |
| 6,640,941 B2 * | 11/2003 | Taylor | ............................ | 188/314 |

\* cited by examiner

*Primary Examiner* — Michael Leslie
(74) *Attorney, Agent, or Firm* — Cozen O'Connor

(57) ABSTRACT

A piston-cylinder unit includes a cylinder having a closure body at the end. The closure body has a sleeve body which is fixedly connected on one side to the closure body and which is fastened to the cylinder. The sleeve body has a base which supports an operating pressure in the cylinder in direction of the closure body.

11 Claims, 7 Drawing Sheets

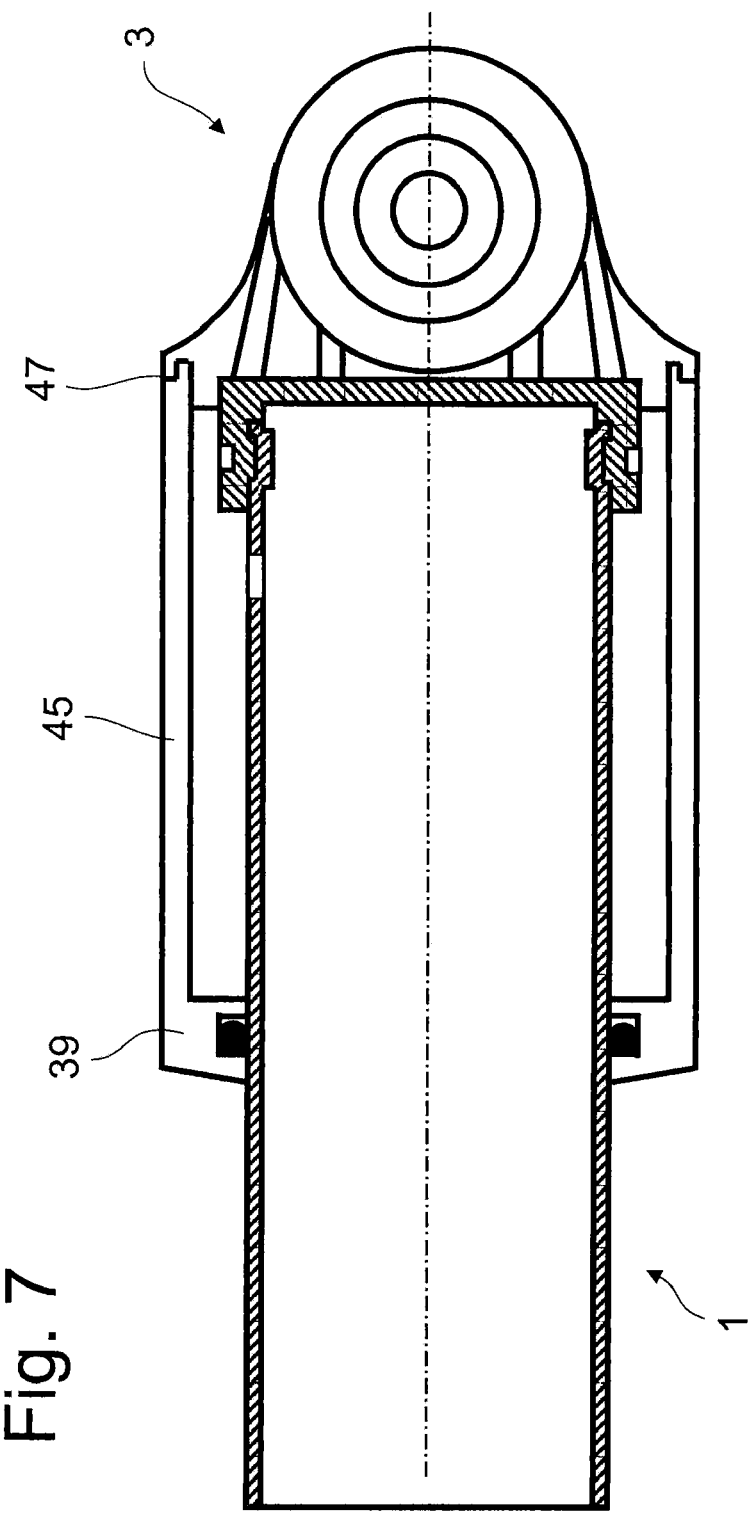

PISTON-CYLINDER UNIT

BACKGROUND OF THE INVENTION

1. Field of the Invention

The invention is directed to a piston-cylinder unit having a closure body and a sleeve body fixedly connected thereto.

2. Description of the Related Art

DE 10 2009 002 891 A1 discloses a piston-cylinder unit constructed in the form of a monotube vibration damper. At least one connection member comprises a plastic base body which is fastened either to a piston rod or in a cylinder. A metallic sleeve body serves to improve transmission of force between the plastic base body and the supporting structural component part, i.e., plastic base body or cylinder.

An operating pressure inside the cylinder also acts on a base which is formed by the plastic base body and which also closes the cylinder on the end side. The operating pressure is transmitted from the metallic sleeve body to the cylinder as an axial force. Thus the plastic base body is the weakest structural component part in the described force flow with respect to strength.

DE 10 2010 014 568 A1 is directed to a piston-cylinder unit in which the connection member likewise closes the cylinder on the end side. The connection member is made of a metallic material which, while certainly meeting the strength value requirements, is appreciably more expensive and heavier.

It is an object of the present invention to further develop a piston-cylinder unit, particularly with a closure body of plastic, in such a way that an operating pressure can be safely absorbed by the closure body.

SUMMARY OF THE INVENTION

According to the invention, this object is met in that the sleeve body has a base which supports an operating pressure in the cylinder in direction of the closure body.

The invention has the great advantage that it minimizes the load on the closure body proceeding from an operating pressure inside the cylinder. This positive effect increases as the cylinder diameter increases.

It is provided in a further advantageous embodiment of the invention that the sleeve body is fastened by its inner lateral surface to an outer lateral surface of the cylinder.

It is provided that the closure body outwardly encloses the sleeve body. The sleeve body is preferably overmolded with plastic so that a pressure-tight connection is provided between the sleeve body and the closure body.

In one embodiment, the sleeve body has at least one bead portion in which a cylinder-side positive engagement element engages. The bead portion can be limited to a circumferential angle, but can also be constructed so as to extend around the entire circumference. Combined with a sleeve body which is slid onto the cylinder outwardly, the positive engagement element can be preloaded to a very high degree radially outwardly because the permissible tensile load in the sleeve body can be appreciably higher compared to a construction in which the sleeve body is arranged inside the cylinder and the cylindrical positive engagement element is preloaded from the radially outer side to the radially inner side.

According to an advantageous embodiment, the closure body is fixed axially over a front side of the sleeve body and the base. The closure body need not have a full-surface covering side in direction of the interior of the cylinder. Connecting webs connecting to the closure body are also sufficient, e.g., for fastening a connection member.

In an alternative embodiment, the closure body enters into a snap-in connection with the front side. This type of construction can be assembled particularly easily.

It can also be provided that the closure body has a bayonet-type profile in which the sleeve body engages.

A possible type of fastening between the closure and the cylinder consists in that the cylinder forms a positive engagement connection with the sleeve body by at least a partial diameter expansion. To this end, a deforming tool is inserted into the cylinder for shaping the positive engagement connection.

A preferred embodiment of the closure body forms an annular space with the outer lateral surface of the cylinder.

A particularly simple embodiment of the closure body for compensating the forces acting on the closure body consists in that an annular surface which faces in pull-out direction of the closure body from the cylinder is constructed so as to be smaller than an opposite annular surface of the annular space. An operating pressure in the annular space always preloads the closure body axially on the cylinder.

For a positive engagement connection between the sleeve body and the cylinder, it is very practical when the closure body has at least one access opening to the sleeve body in the region of the outer lateral surface of the cylinder. A deforming tool can be inserted via the access opening.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

The invention will be described in more detail based on the following description of the drawings in which:

FIG. 7 is a cross-sectional view of a cylinder as variant of FIG. 5.

DETAILED DESCRIPTION OF THE PRESENTLY PREFERRED EMBODIMENTS

Figure 1:
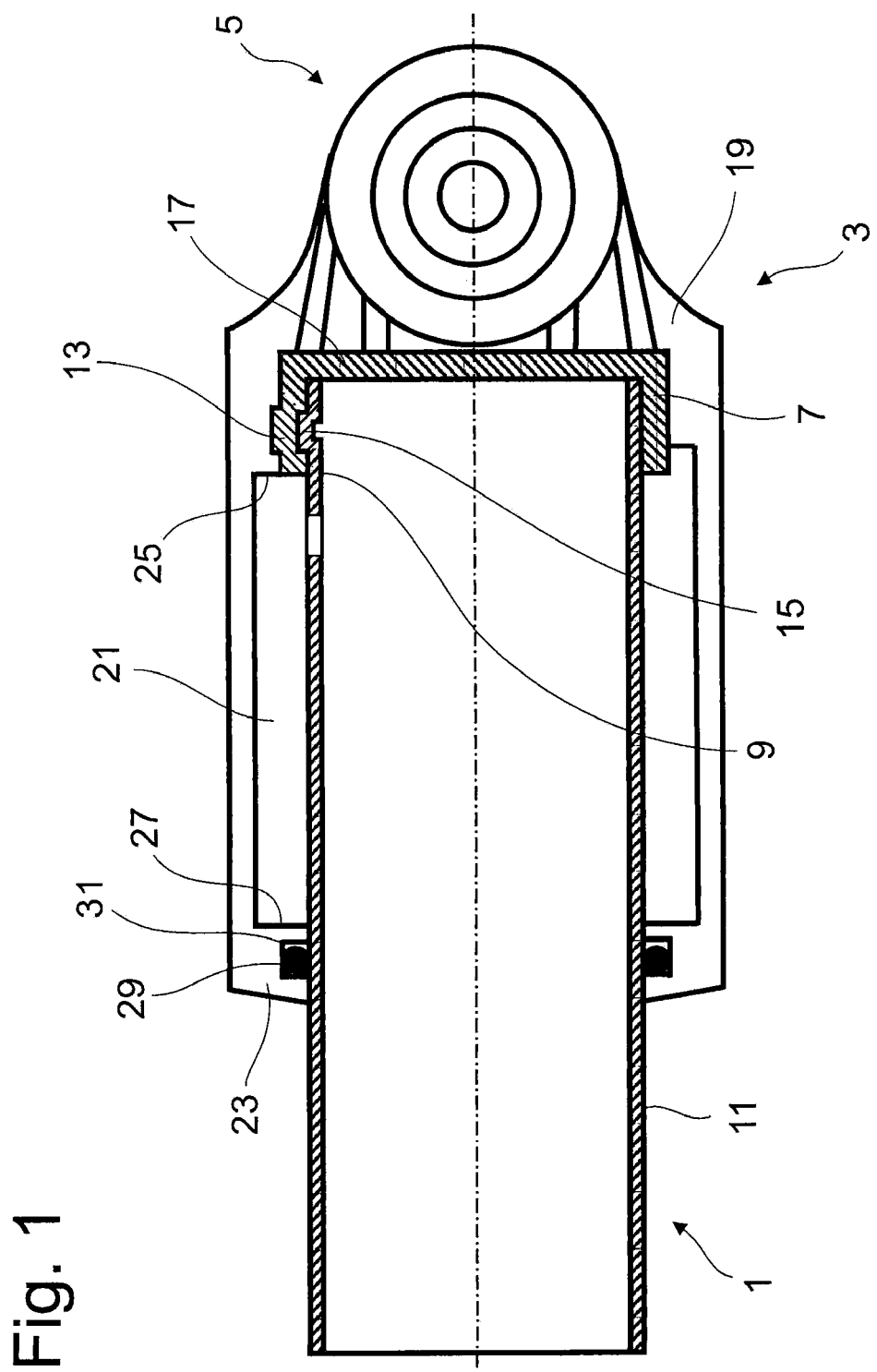
FIG. 1 is a cross-sectional view of a cylinder of a piston-cylinder unit with a bead.

FIG. 1 shows a cylinder 1 of a piston-cylinder unit of any type of construction, e.g., of a well-known vibration damper. The cylinder 1 is preferably made of a metallic material and can already have a surface coating for further finishing.

The open-ended cylinder 1 has a closure body 3 which is provided with a connection member 5, in this case, an annular eye. In contrast to the cylinder, the closure body 3 is preferably formed of a plastic which is overmolded on the outer side of a sleeve body 7 and accordingly encloses the sleeve body 7. A pressure-tight connection between the sleeve body 7 and the closure body 3 is provided by the overmolding.

The sleeve body 7 is in turn fastened by its inner lateral surface 9 to an outer lateral surface 11 of the cylinder 1. In this embodiment, the sleeve body 7 has at least one bead portion 13 in which a cylinder-side positive engagement element, namely, a radially outwardly shaped bead portion 15, engages.

The sleeve body 7 has a base 17 which supports an operating pressure in the cylinder 1 axially in direction of the closure body 3. As is also shown in the drawing, a full-surface base is not needed at the closure body 3 for connecting the connection member 5 and for the sealing function of the open cylinder end. Therefore, the connection between the connection member 5 and the closure body 3 is formed by a plurality of webs 19.

Together with the outer lateral surface 11 of the cylinder 1, the closure body 3 forms an annular space 21 which is axially bounded by a circumferential sealing web 23 of the closure body 3 and, e.g., can serve as a compensation space for an operating medium in the cylinder 1. The annular space 21 has a constant outer diameter. Because the sleeve body 7 is fastened to the cylinder 1 on the outer side, an annular surface 25 facing in the pull-out direction of the closure body 3 from the cylinder 1 is necessarily smaller than an oppositely located annular surface 27 of the annular space 21 and of the closure body 3. Therefore, an operating pressure in the annular space always leads to an axial preloading of the closure body 3 on the cylinder 1.

During production of the closure body 3, the sleeve body 7 which is constructed integral with the base 17 is inserted into the injection mold. An annular seal 29 is then possibly fitted in a seal groove 31. The sleeve body 7 already has the at least one bead portion 13 so that tensile forces proceeding from the connection member 5 are received by the at least one bead portion 13.

The closure body 3 and the sleeve body 7 which is fixed therein are subsequently slid onto the cylinder 1. The axially correct position can be defined, e.g., by the stop of the base 17 at a front side of the cylinder 1. Subsequently, a deforming tool, not shown, is inserted into the cylinder 1 to shape the cylinder-side positive engagement element 15. The position of the bead portions 13 in the closure 3 can be monitored, e.g., very easily by the orientation of the connection member 5.

Figure 2:
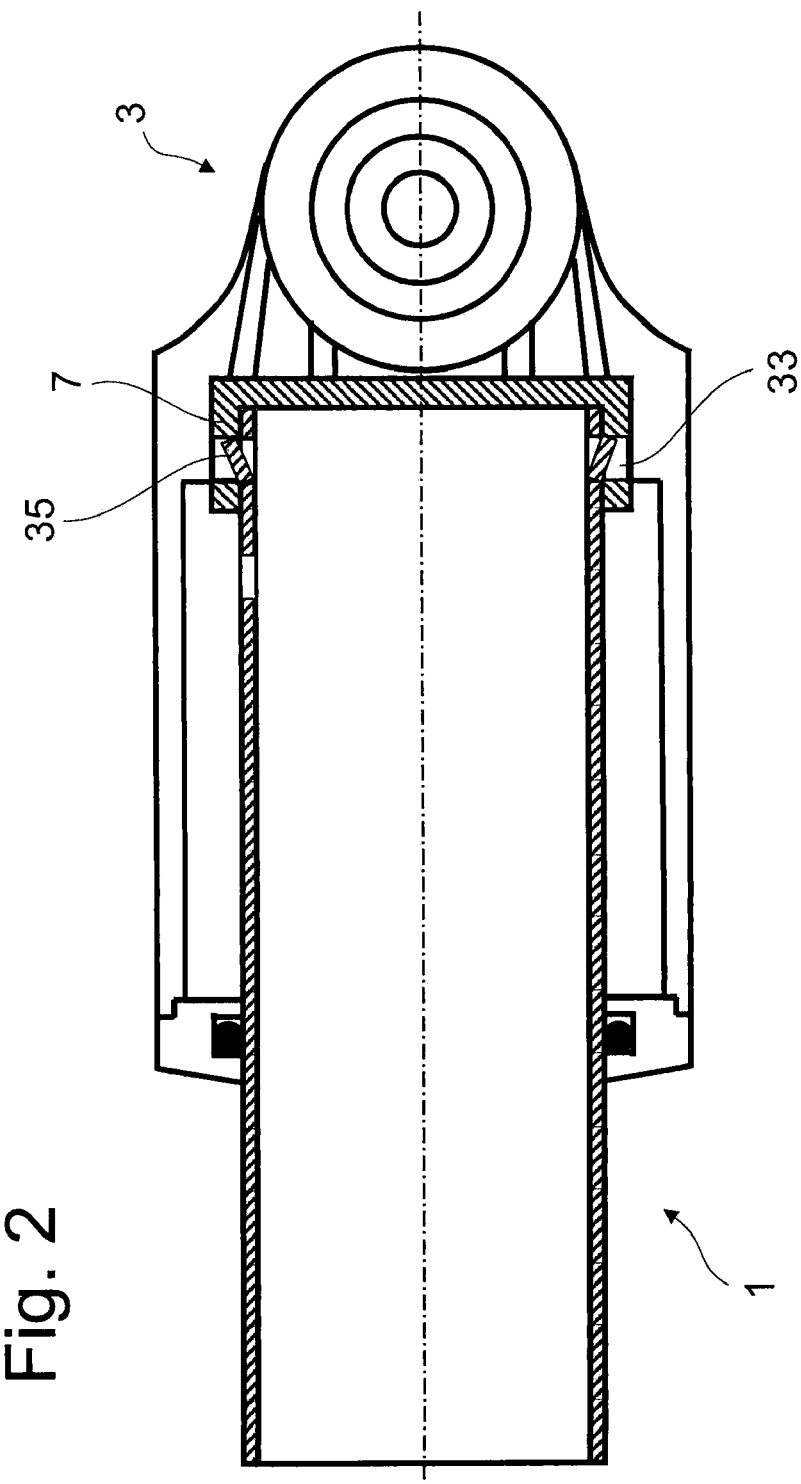
FIG. 2 is a cross-sectional view of a cylinder with a cylinder-side positive engagement element.

FIG. 2 shows a construction of the cylinder 1 based on the construction principle shown in FIG. 1. A difference consists in that the sleeve body 7 does not have any bead portions but has instead a circumferential groove 33 for receiving a partial diameter expansion 35 of the cylinder 1 so as to form a positive engagement connection to the sleeve body 7. The diameter expansion can also be configured as a radial tongue which snaps into the groove 33.

Figure 3:
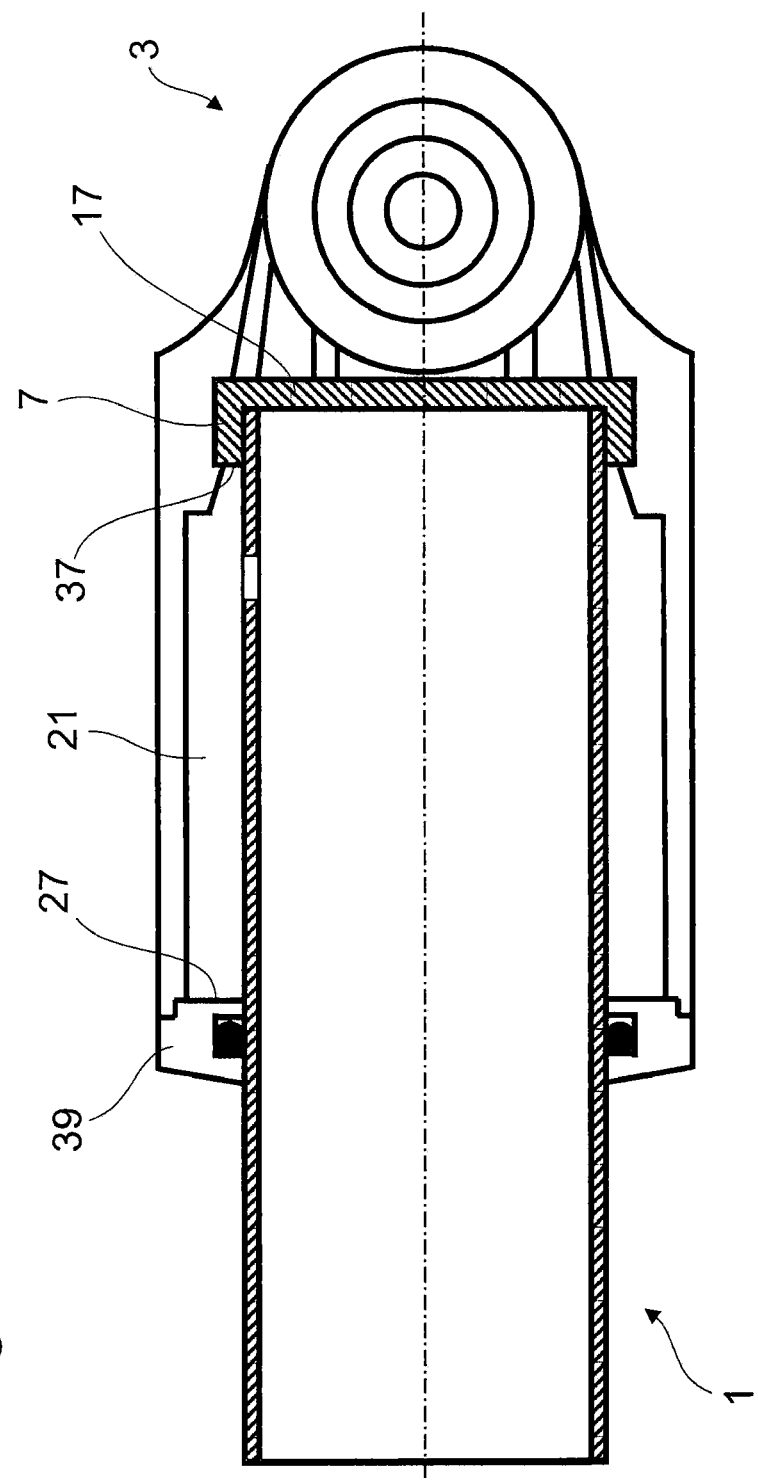
FIG. 3 is a cross-sectional view of a cylinder with a snap-in connection for the closure body.

The embodiment according to FIG. 3 shows a closure body 3 which is fixed axially between a front side 37 of the sleeve body 7 and the base 17. The closure body 3 enters into a snap-in connection with the front side 37 of the sleeve body 7. A further difference with respect to the construction according to FIG. 1 consists in that the closure body 3 is formed of at least two parts in that the annular surface 27 of the closure body 3 opposite the base 17 is formed at an individual part and is connected to the closure body after the latter is assembled.

In preparatory work steps, the multiple-part closure body 3 is produced by injection molding. The sleeve body 7, including base 17, is snapped into the closure body 3. A portion 39 with the annular surface 27 is subsequently slid onto the cylinder 1. In a subsequent step, the sleeve body 7 is pushed onto the cylinder 1. The axial fixing of the sleeve body 7 can be realized, for example, by means of a glue connection. Finally, the annular space 21 is closed by portion 39, e.g., also by means of a glue connection or by ultrasonic welding.

Figure 4:
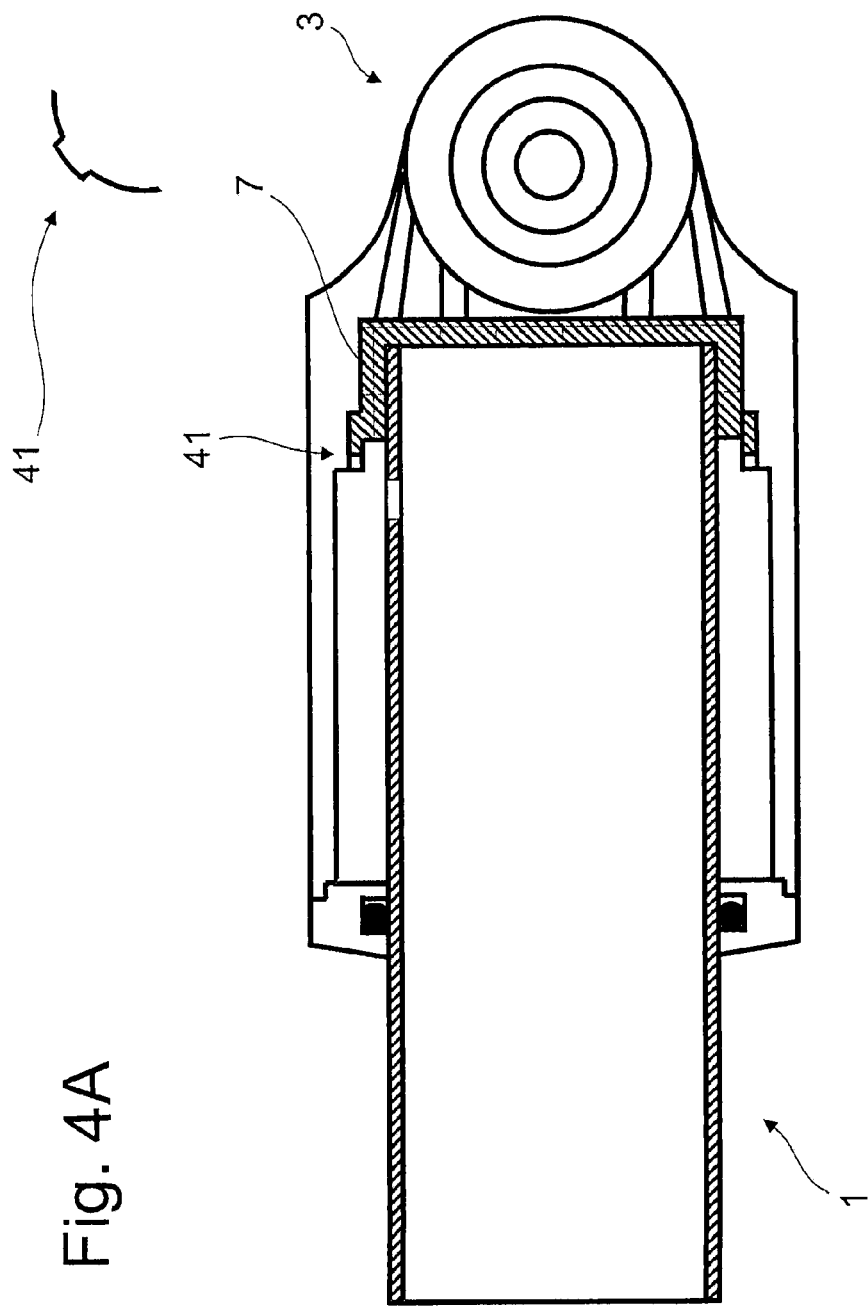
FIG. 4A is a cross-sectional view of a cylinder with a bayonet-type fastening for the closure body.
FIG. 4B is a schematic view of the bayonet-type fastener of FIG. 4A.

FIGS. 4A and B show a modification of the construction according to FIG. 3. Instead of the snap-in connection, a bayonet-type connection shown schematically in FIG. 4B is used. To this end, the closure body has a bayonet-type profile 41 on the inner side, the sleeve body 7 engaging in this bayonet-type profile 41.

It is also possible in principle to carry out the positive engagement connection between the sleeve body 7 and the cylinder 1 by moving a tool radially inwardly from the outside.

Figure 5:
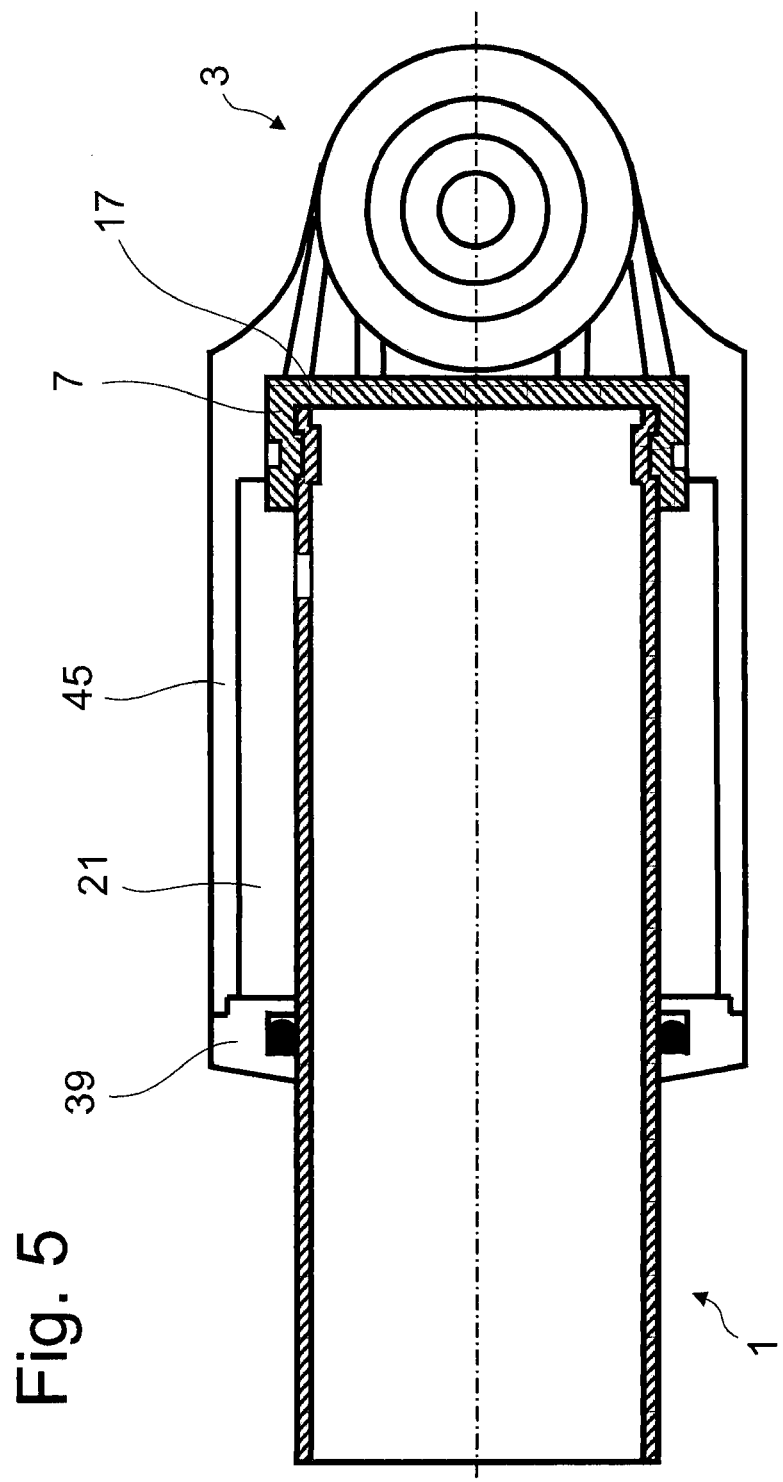
FIG. 5 is a cross-sectional view of a cylinder with a radially inwardly closed positive engagement connection.

FIG. 5 shows an embodiment in which the sleeve body 7, including base 17, and the cylinder 1 are connected to one another, e.g., beaded, in a preparatory work step. The closure body 3 is overmolded on this constructional unit accompanied by formation of an open annular space 21. In a further work step, the annular space 21 is closed by the separate portion 39.

Figure 6:
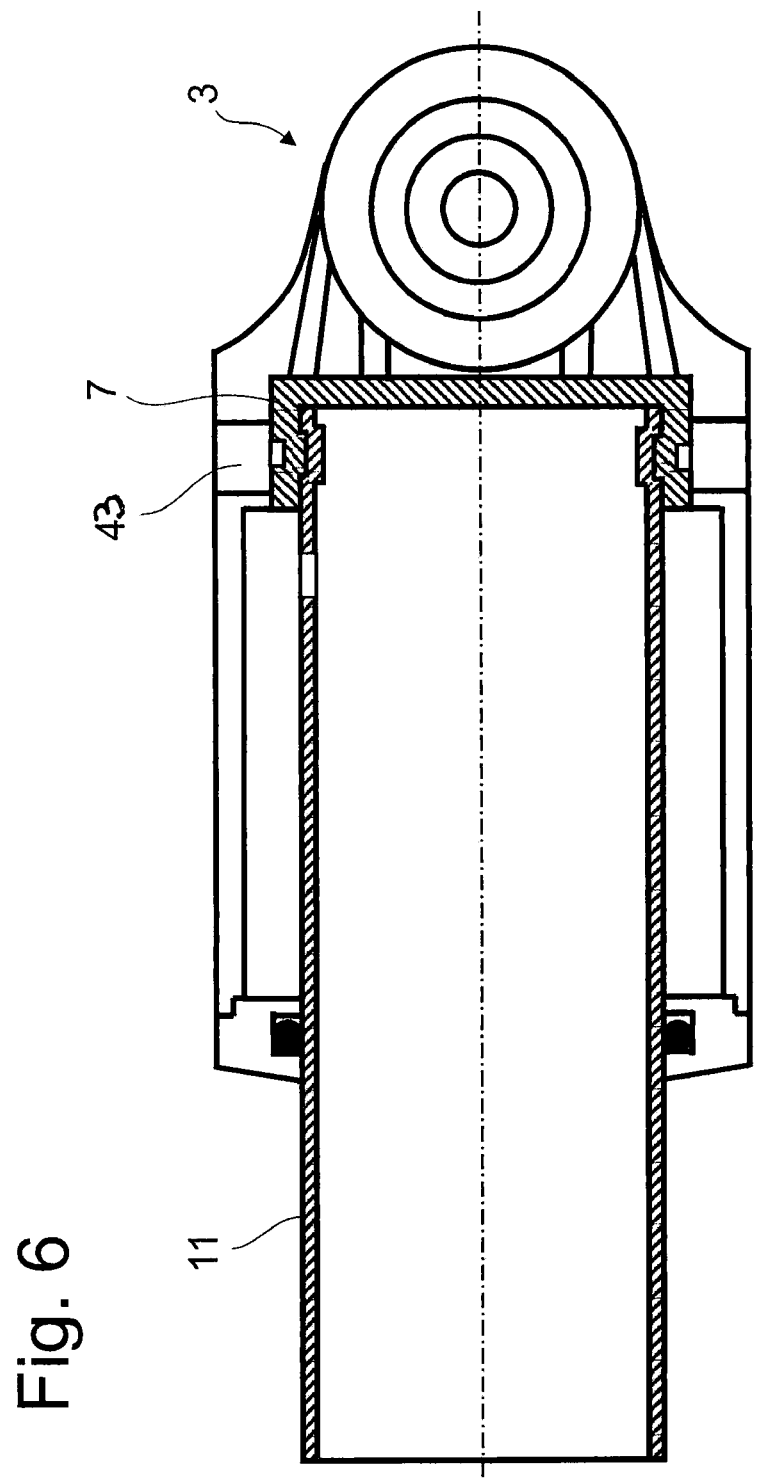
FIG. 6 is a cross-sectional view of a cylinder according to FIG. 5 with an access opening.

Alternatively, as is shown in FIG. 6, the closure body 3 has at least one access opening 43 to the sleeve body 7 in the region of the outer lateral surface 11 of the cylinder 1. The access opening 43 affords the possibility of constructing the closure body 3 in one piece according to FIG. 1. The closure body with the sleeve body 7 is constructed by injection molding and this constructional unit is slid onto the outer lateral surface 11 of the cylinder 1. The deforming tool can then be inserted through the access opening 43 to produce the positive engagement connection between the sleeve body 7 and the cylinder 1.

FIG. 7 shows a modification over FIG. 5. In FIG. 5, portion 39 is merely formed by an annular body. A tubular portion 45 is a component part of the closure body 3. In FIG. 7, portion 39 and tubular portion 45 are formed integrally. Accordingly, a connection joint 47 between the tubular portion 45 and the closure body 3 is displaced so that the sleeve body 7 can be accessed by a deforming tool before connecting the tubular portion 45 to the closure body.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

We claim:

1. A piston-cylinder unit comprising:
   a cylinder (1) having an end;
   a closure body (3) at said cylinder end, said closure body (3) having a recess therein;
   a sleeve body (7) fixedly connected on one side to said closure body (3) and fastened to said cylinder (1); said sleeve body (7) having a base (17) constructed for supporting an operating pressure in said cylinder (1) in direction of said closure body (3); said sleeve body having an outer surface dimensioned to be inserted into said recess within and in contact with said closure body (3); and wherein said closure body (3) outwardly encloses said sleeve body (7) so as to provide a pressure-tight connection between said sleeve body (7) and said sleeve body (3).

2. The piston-cylinder unit according to claim 1, wherein said sleeve body comprises an inner lateral surface and said cylinder comprises an outer lateral surface and wherein said sleeve body (7) is fastened by said inner lateral surface (9) to said outer lateral surface (11) of said cylinder (1).

3. The piston-cylinder unit according to claim 1, wherein said sleeve body (7) has at least one bead portion (13) for engaging a cylinder-side positive engagement element (13).

4. The piston-cylinder unit according to claim 1, wherein said closure body (3) is fixed axially over a front side (37) of said sleeve body (7) and said base (17).

5. The piston-cylinder unit according to claim 4, wherein said closure body (3) is constructed for entering into a snap-in connection with the front side (37).

6. The piston-cylinder unit according to claim 1, wherein said closure body (3) has a bayonet-type profile (41) for engaging said sleeve body (7).

7. The piston-cylinder unit according to claim 1, wherein said cylinder (1) comprises at least a diameter expansion for forming a positive engagement connection with said sleeve body (7) by said at least partial diameter expansion (35).

8. The piston-cylinder unit according to claim 1, wherein said closure body (3) forms an annular space (21) with said outer lateral surface (11) of said cylinder (1).

9. The piston-cylinder unit according to claim 8, additionally comprising a first annular surface (25) facing in a pull-out direction of said closure body (3) from said cylinder (1) and an opposing second annular surface (27) of said annular space (21) and wherein said first annular surface (25) has a width smaller than the width of said second opposing annular surface (27).

10. The piston-cylinder unit according to claim 2, wherein said closure body (3) has at least one access opening (43) to said sleeve body (7) in the region of said outer lateral surface (11) of said cylinder (1).

11. The piston-cylinder unit according to claim 8, additionally comprising a circumferential sealing web (23) so that annular space (21) serves as a compensation space for an operating medium in said cylinder (1).

* * * * *